Feb. 20, 1968     O. C. NIEDERER     3,369,644
EGG HANDLING EQUIPMENT
Filed Nov. 23, 1966     4 Sheets-Sheet 1
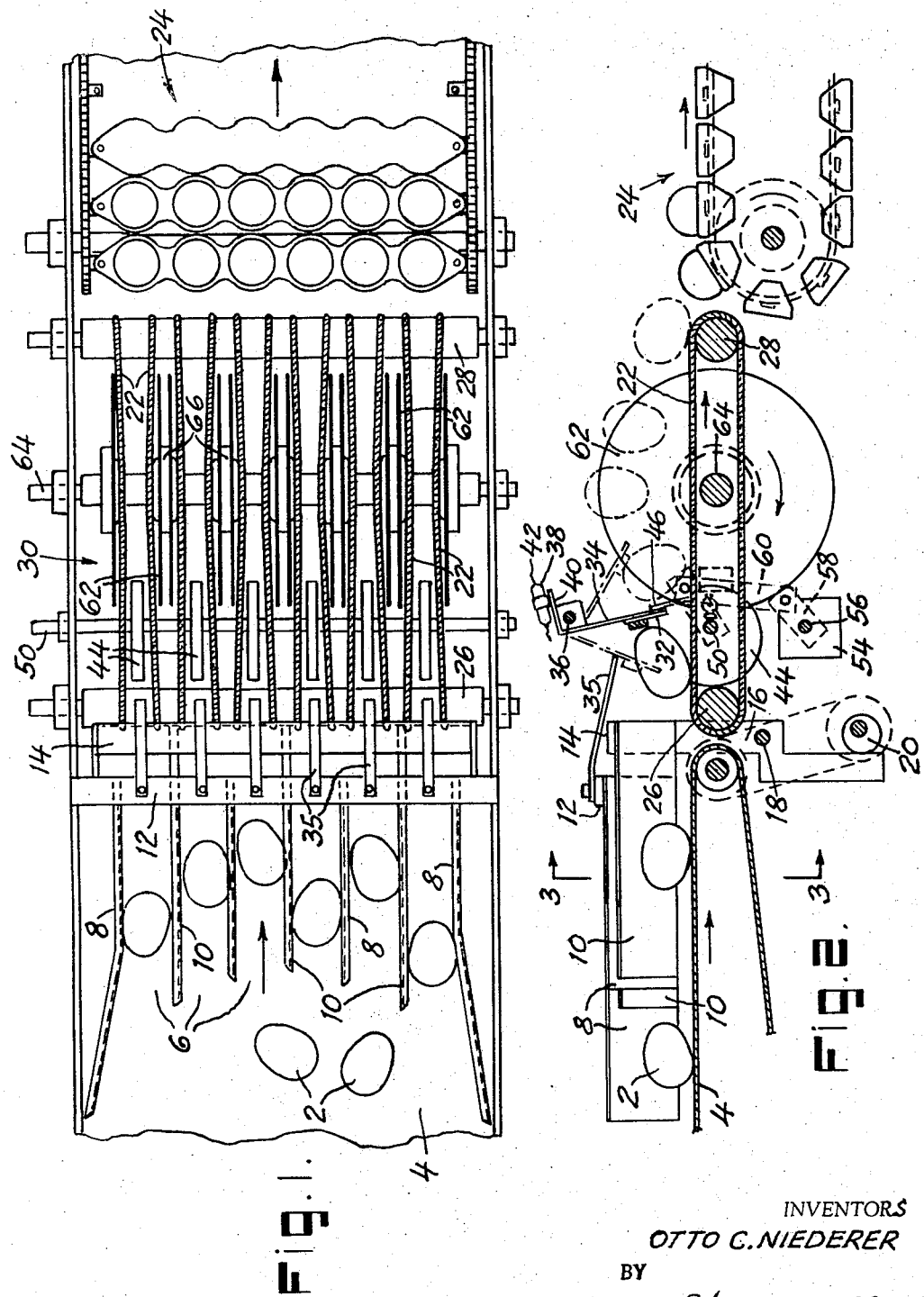
INVENTORS
OTTO C. NIEDERER
BY
Sperry and Zoda
ATTORNEYS Feb. 20, 1968     O. C. NIEDERER     3,369,644
EGG HANDLING EQUIPMENT
Filed Nov. 23, 1966     4 Sheets-Sheet 2
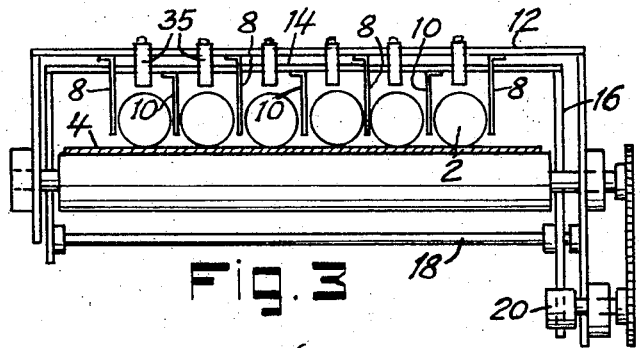
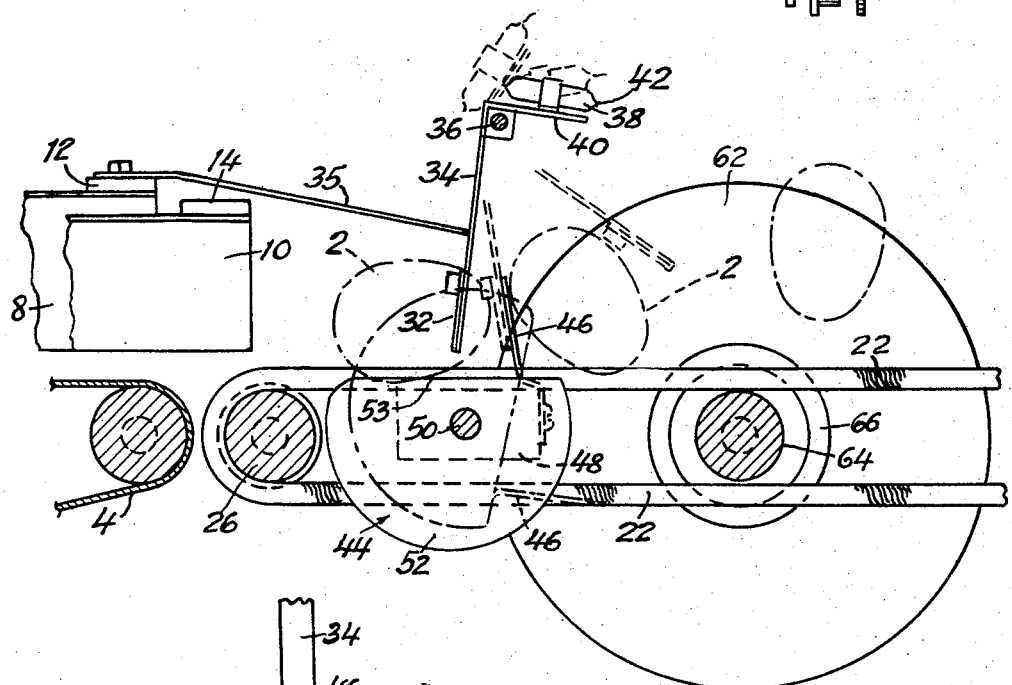
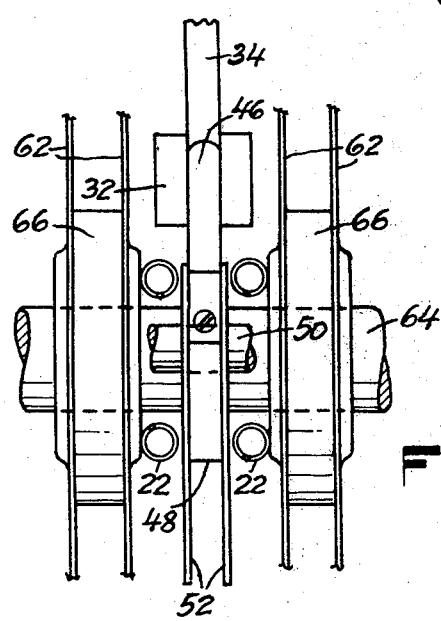
INVENTORS
OTTO C. NIEDERER
BY
*Sherry and Jodor*
ATTORNEYS

INVENTOR.
OTTO C. NIEDERER

United States Patent Office 3,369,644
Patented Feb. 20, 1968

3,369,644
EGG HANDLING EQUIPMENT
Otto C. Niederer, Bear Tavern Road,
Titusville, N.J. 08560
Filed Nov. 23, 1966, Ser. No. 596,545
10 Claims. (Cl. 198—33)

ABSTRACT OF THE DISCLOSURE

Mechanism for positioning eggs in a predetermined arrangement with the larger ends of the eggs facing in the same direction to facilitate packing of the eggs. The mechanism comprises a plurality of parallel channels through which eggs are movable, means for supplying eggs to the channels, and a pair of discs associated with each channel and located on opposite sides of said channels in position to engage eggs movable through the channels. The discs are rotatable and are formed and mounted in such a way that the peripheral portion of the discs are yieldably movable toward and away from each other to lightly engage the eggs at opposite sides thereof and at points on the eggs where they are of greatest diameter whereby the eggs are movable with respect to the discs into positions wherein the larger ends of the eggs face in the same direction.

---

In accordance with U.S. Patent No. 3,260,348, means are provided for arranging eggs with the larger ends thereof facing in the same direction for transfer to a conveyor, packer or other egg handling machine. For this purpose, control means are employed in combination with egg orienting means in the form of discs which present spaced tapered surfaces by which the eggs are supported at diametrically opposite points on the eggs so as to permit the eggs to rotate about the larger portion thereof into similar positions. The control means and egg orienting means cooperate to assure placement of successive groups of eggs on a conveyor or the like with the larger ends of all of the eggs of each group facing in the same direction.

While such constructions have been widely and successfully used, it is sometimes found that a limited number of eggs are not properly oriented or handled. This is probably due in some instances to the fact that an egg is nearly spherical in shape and in other cases the egg may be so elongated or so small that it will enter so far into the space between the discs that it cannot rotate freely to a properly oriented position. It is also found that eggs which have been washed with certain detergents tend to slip when in contact with the tapered surfaces of the discs.

In any event, it has now been found that improved and more consistent results can be attained in the orienting of eggs, and that eggs varying greatly in size and shape can be handled and oriented effectively by employing an improved type of egg orienting means. For this purpose, the equipment is provided with rotatable discs which are transversely flexible or movable so as to receive and hold the eggs adjacent to the peripheries of the discs and in such a yielding manner as to assure free rotation of the eggs into the desired oriented positions.

The present invention further may include improved means for controlling the movement of eggs to and from the egg orienting discs.

Accordingly, the principal objects of the present invention are to increase the effectiveness and consistency in operation of equipment for orienting eggs and the like; to afford greater freedom in the movement of eggs with respect to egg orienting means; and to simplify the construction and operation of egg orienting equipment.

A specific object of the present invention is to provide egg orienting means with rotatable egg receiving and moving discs which are transversely flexible or movable so as to hold eggs adjacent to the periphery of the discs in a manner which permits relatively free movement of eggs of various different sizes and shapes with respect to the discs and into properly oriented positions.

These and other objects and features of the present invention will appear from the following description thereof wherein reference is made to the figures of the accompanying drawing.

In the drawing:

FIG. 1 is a plan view of a typical form of egg orienting equipment embodying the present invention;

FIG. 2 is a longitudinal sectional view through the equipment illustrated in FIG. 1;

FIG. 3 is a transverse sectional view of the construction shown in FIGS. 1 and 2 taken on the line 3—3 of FIG. 2;

FIG. 4 is an enlarged view of typical control elements which may be employed in equipment embodying the present invention;

FIG. 5 is a view of the control elements shown in FIG. 4 taken at right angles thereto;

Figure 6:
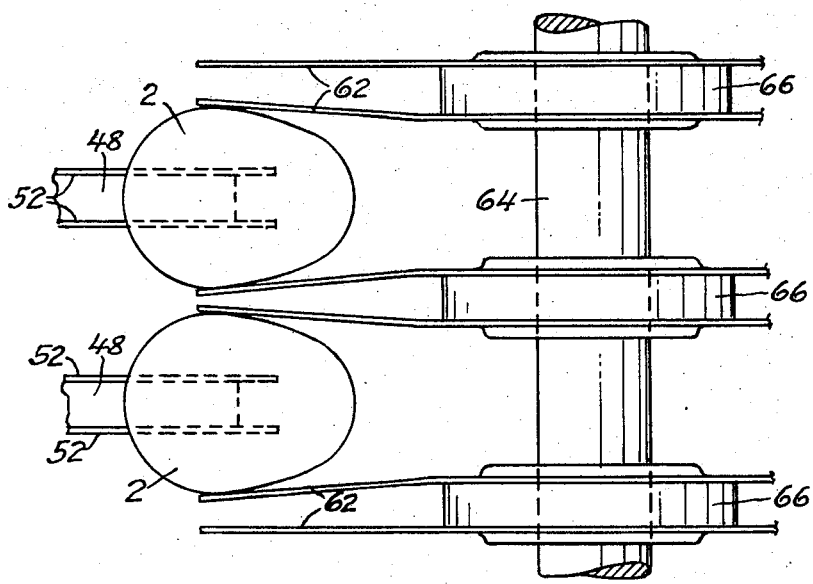
FIG. 6 is an enlarged plan view of the egg orienting discs illustrated in FIG. 1.

In that form of the invention chosen for purposes of illustration in FIGS. 1 to 7 of the drawings, the eggs or articles 2 being handled are supplied to the equipment from a belt, tray or other means indicated at 4 and are caused to enter the channels 6 between dividers 8 and 10. The dividers 8 preferably are held in fixed positions by a cross strap 12 to form one side of each of the channels 6 whereas the dividers 10 which define the opposite side of each of the channels 6 are movable intermittently and a short distance vertically to displace the eggs entering the channels 6 in such a way as to prevent the eggs from accumulating, clogging, or blocking the movement of the eggs from the belt 4 into the channels 6. For this purpose, the dividers 10 are carried by a cross strap 14 which has an arm 16 extending downward therefrom at one side of the equipment and pivotally mounted at 18 for rocking movement. An eccentric element or cam 20 engages the arm 16 below its pivot 18 so as to cause the arm to be rocked and the dividers 10 to move up and down a short distance as the eccentric 20 is rotated. In this way, the eggs entering the channels 6 are displaced or moved sufficiently to overcome any tendency for the eggs to accumulate at the entrances of the channels in a manner to interfere with their movement into and through the channels 6. As a result, the equipment serves to assure the entry and movement of an egg into each of the channels 6.

Egg advancing belts 22 are arranged in pairs in alignment with each of the channels 6 and extend from points adjacent the discharge end of the belt or tray 4 to points adjacent the egg receiving equipment 24, which may be a conveyor, tray or other device to which the oriented eggs are to be delivered, as for example, egg packing equipment of the type shown and described in copending application Ser. No. 338,192. The egg advancing belts 22 are preferably formed of coiled spring material but may be of any suitable or preferred construction and are arranged to pass about the pulleys or roller 26 adjacent the discharge end of the belt 4 to the pulleys or rollers 28 adjacent the equipment 24 so as to cause the eggs to be advanced from the channels 6 to the egg orienting means, indicated generally at 30, and from the egg orienting means 30 to the egg receiving equipment 24.

Control and sensing means are associated with each of the channels 6 to retard the movement of the eggs through the channels until a complete set of eggs, consisting of one egg from each channel, is ready for movement through the egg orienting means to the equipment 24. For this purpose, elements of the type shown and described in U.S. Patent No. 3,260,348 may be employed. However, as shown in FIGS. 4 and 5, the egg control and sensing means may embody a stop member 32 carried by an arm 34 pivotally mounted at 36. A mercury switch 38 or the like is mounted on the extension 40 of arm 34 in position to act as a counterweight tending to move the stop member 32 to the left as seen in FIG. 4. Limit strips 35 mounted on the cross strap 12 and extending toward the arms 34 serve to hold the stop members 32 in position to be engaged by eggs being advanced through the channels 6 by the egg advancing belts 22. When so positioned, the mercury switch 38 or other sensing device associated with the stop member 32 is held in a position to break a control circuit 42 including the switch. However, when an egg enters the channel 6 and is moved into engagement with the stop member 32, the arm 34 and its extension 40 are moved to the right as seen in FIG. 4 to tilt the mercury switch and render it operative to permit completion of the control circuit 42 in which it is included.

A control device 44 serves to hold the stop members 32 in egg retarding position until a full complement of eggs is ready for release and orientation. For this purpose, the control device is provided with a holding member 46 secured to a block 48 carried by a rock shaft 50. The holding member 46 is in the form of a spring finger which is normally held in a substantially vertical position to prevent movement of the stop member 32 and arm 34 about its pivot 36 to an egg releasing position. Egg moving plates 52 are secured to the block 48 and present upwardly facing egg engaging surfaces 53 positioned below the belts 22 in each of the channels 6.

Figure 7:
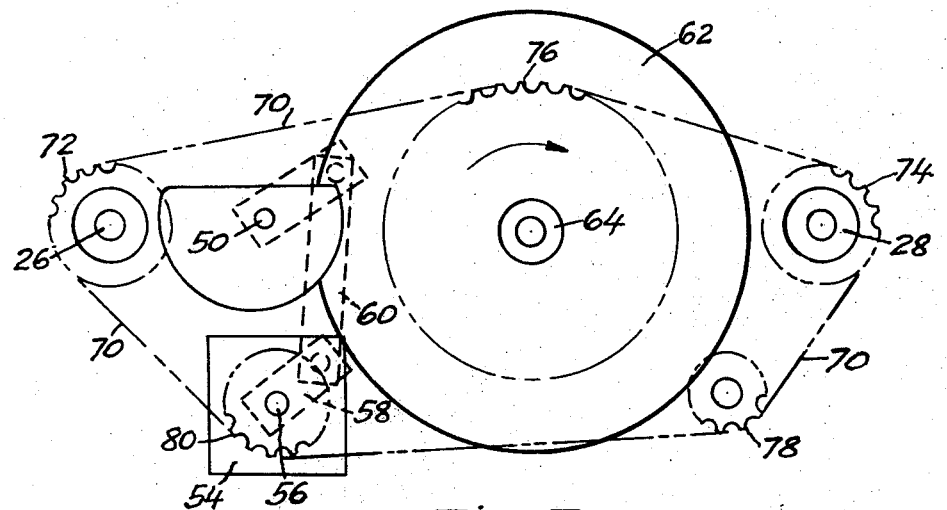
FIG. 7 is a diagrammatic illustration of typical driving connections which may be employed in the equipment of the present invention.

The control device 44 with its holding member 46 and egg moving plates 52 is movable by the rock shaft 50 to the tilted dotted line position of FIG. 4 under the control of control circuit 42 which includes the series connected mercury switches 38 for actuating a single revolution magnetic clutch or the like indicated at 54 in FIGS. 2 and 7. When the magnetic clutch is actuated in response to the presence of an egg in each of the channels 6, shaft 56 is rotated and crank 58 is moved through a single revolution to oscillate the rock shaft 50 through connecting link 60. The holding members 46 are thereby moved clockwise as seen in FIG. 4 to permit the stop members 32 to be moved to the right and allow the eggs to be moved onward by the egg advancing belts 22 and by the egg moving plates 52. The eggs are thereby thrust or allowed to move between the spaced egg orienting discs 62 of the egg orienting means 30. Thereafter, the rock shaft 50 serves to return the block 48, holding member 46, and egg moving plates 52 to the full line position of FIG. 4 wherein the elements of the control mechanism are returned to their initial or normal positions in readiness for renewed operation when another complete set of eggs has been moved into position for release and movement to the egg orienting means 30.

The egg orienting means of the present invention embodies pairs of spaced article receiving members such as the egg orienting plates or discs 62 mounted for rotation by a shaft 64. The discs 62 are located at the opposite sides of each channel 6 and the egg advancing belts 22 move between the inner faces of the discs and above the shaft 64 by which the discs are rotated. The discs at opposite sides of adjacent channels 6 are spaced apart by collars 66 or other spacing means on the shaft 64. The discs themselves are preferably quite flexible or otherwise constructed and arranged so that at least the peripheral portions thereof are relatively movable and yieldable toward and away from each other as shown in FIG. 6. The discs are preferably formed of thin, flexible plastic material and the inner surfaces of the discs are preferably substantially smooth, flat and parallel.

When thus formed, the eggs, whatever their size, are moved or thrust between the peripheral portions of the discs 62 by the egg advancing belts 22 and the egg moving plates 52. The peripheral portions of the discs 62 then may flex or move apart so that each egg will be yieldably and lightly gripped at diametrically opposite points on the portion of the egg of largest diameter. Moreover, the spacing of the discs 62 associated with each channel from the discs of adjacent channels at opposite sides thereof, renders it possible for the egg orienting discs of each channel to flex and operate independently of the discs associated with any other channel. Therefore, eggs which vary considerably in size and shape can be handled simultaneously by the pairs of flexible discs in each channel without interference of one with another.

As the discs 62 rotate, the eggs which are lightly gripped therebetween, are raised from the egg advancing belts 22 and are free to tilt or rotate about their diametrically opposite points of support without danger of wedging or slipping downward between the discs to positions which might restrict or interfere with the free orientation thereof. Thereafter, as the discs continue to rotate, the eggs, properly oriented, are lowered onto the egg advancing belts 22 whereby the belts receive and move the eggs onward from the discs 62 to the equipment 24 with the larger ends of the eggs all facing in the same direction.

The movement and operation of the various elements of the equipment may be effected by any suitable type and combination of drive means and the like. However, as shown in FIG. 7, the egg advancing belts 22 and the pulleys 26 and 28 are driven by a chain 70 which passes about the sprockets 72 and 74 secured to pulleys 26 and 28 respectively. The chain 70 also passes over a sprocket 76 secured to the shaft 64 for rotating the discs 62. The chain 70 thereafter passes beneath the tensioning sprocket 78 and about a sprocket 80 secured to shaft 56 to actuate the crank 58 and rock shaft 50 under control of the magnetic clutch 54. In this way, the movement of the egg advancing belts and egg orienting discs may be coordinated whereas the operation of the egg releasing means and egg moving means are controlled by the control circuit and magnetic clutch to assure the delivery of complete sets or groups of eggs from the egg orienting means to the equipment 24. Smooth continuous and high speed orientation of the eggs is thereby accomplished with a degree of consistency and accuracy which is substantially increased.

Figure 8:
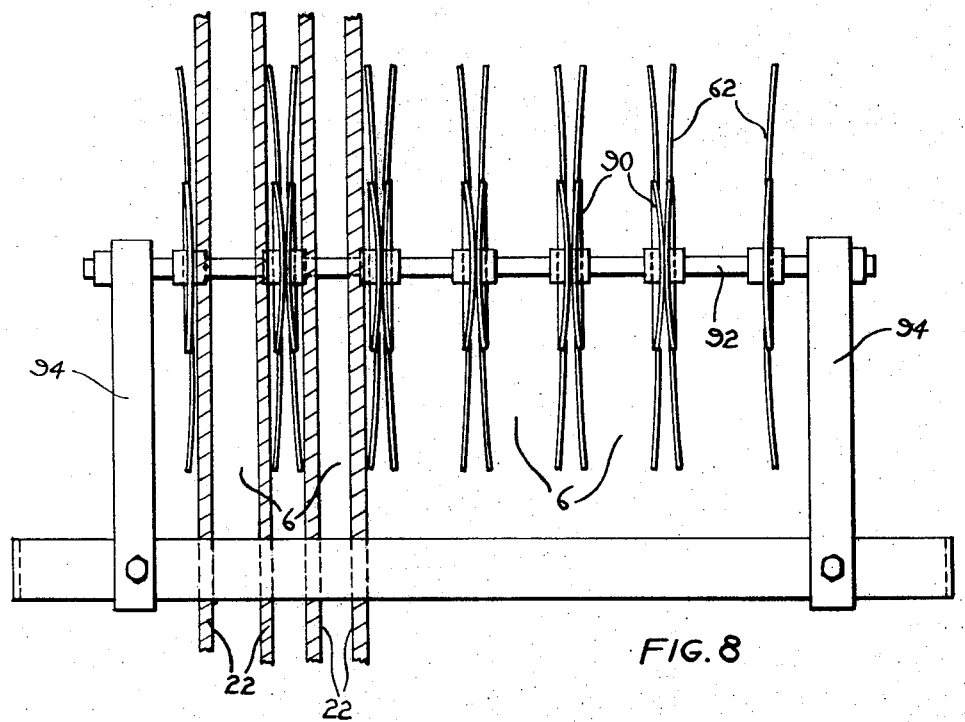
FIG. 8 is a plan view of an alternative construction embodying the present invention.
Figure 9:
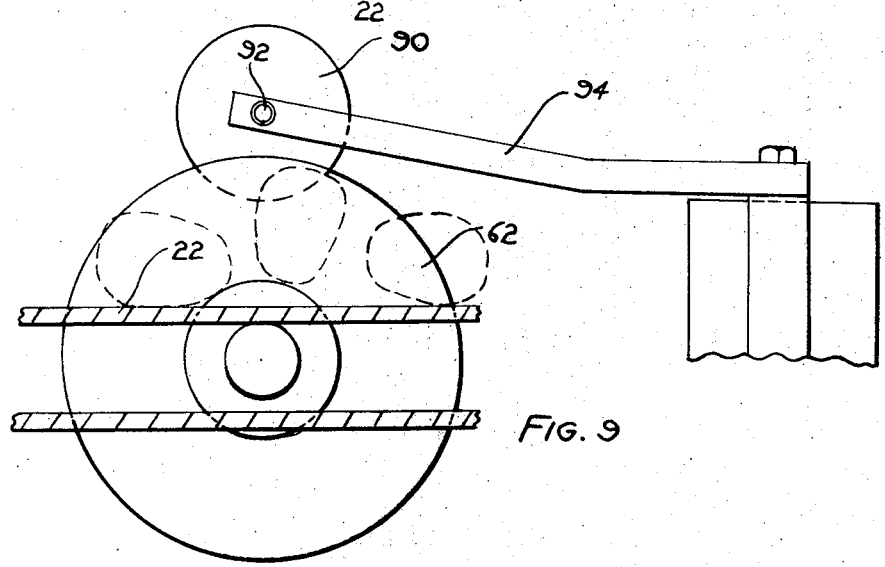
FIG. 9 is a side elevation of the construction shown in FIG. 8.

The alternative construction illustrated in FIGS. 8 and 9 is similar to that shown in FIGS. 1 to 7 but includes spreader or disc deflecting members 90 and in the form of idler discs rotatable on a rod 92 mounted on brackets 94 and extending across the egg orienting device above the flexible discs 62. The spreader members 90 engage the inner surfaces of the discs 62 of adjacent channels 6 and serve to hold the discs 62 in their outwardly flexed or spread positions as they rotate through an extended arc of, say 90° or so, after receiving the eggs therebetween and as they raise the eggs from the egg advancing belts 22.

This construction has been found to be particularly useful when the eggs 96 being oriented are relatively large or have been washed in such a way as to remove the natural "bloom" from the surface of the eggs so as to render the shell unusually smooth or even slippery. In orienting such eggs, it is desirable to permit the eggs to enter between the discs 62 to points nearer the axis of rotation of the discs so as to assure positive contact of the discs with the eggs and to allow a somewhat longer period of time for the eggs to swing or shift into their properly oriented positions before they are redeposited on the egg advancing belts 22 at the opposite side of the discs 62 for movement on past the discs to the conveyor 24 or other equipment.

While the specific elements of the combination and the form and arrangement thereof shown in the drawings and described above is preferred, it will be apparent that numerous changes and modifications thereof may be made if desired. In view thereof, it should be understood that the particular embodiment thereof herein set forth is intended to be illustrative only and is not intended to limit the scope of the invention.

I claim:

1. Equipment for arranging articles such as eggs with the larger ends thereof extending in the same direction comprising a pair of article orienting discs having portions thereof spaced apart a distance less than the diameter of said articles to receive the articles to be oriented therebetween, means for rotating said discs about the axes thereof, at least the peripheral portions of said discs being yieldably movable toward and away from each other to provide a limited article engaging contact with the articles at diametrically opposite points thereon where the article is of greatest diameter, and article advancing means for moving articles into and out of the space between said discs.

2. Equipment as defined in claim 1 wherein article moving means are provided for positively thrusting articles from said article advancing means into the space between said article orienting discs.

3. Equipment as defined in claim 1 wherein said article advancing means are movable between the article orienting discs above the axes of rotation thereof, and the article orienting discs upon rotation serve to lift articles moving into the space therebetween from the article advancing means and thereafter lower said articles onto the article advancing means in similarly oriented positions.

4. Equipment as defined in claim 3 wherein article retarding means are located in each channel in advance of said article orienting discs, and control means responsive to the presence of an article in each of said channels are connected to said retarding means to actuate all of said retarding means simultaneously to permit the passage of groups of articles from the article moving means to said discs.

5. Equipment as defined in claim 1 wherein a plurality of channels are provided through which the articles to be oriented are movable and each channel has a separate pair of flexible article orienting discs associated therewith and located on opposite sides of the channels, with the surfaces of said discs facing toward said channels positioned to engage articles moving through said channels.

6. Equipment as defined in claim 1 wherein means engage said discs to spread the peripheral portions of the discs apart during an extended arc of rotation of the discs.

7. Equipment as defined in claim 1 wherein means engage said discs to deflect the peripheral portions of the discs as the discs rotate through an arc of about 90°.

8. In equipment for arranging eggs with the larger ends thereof facing in the same direction wherein the equipment embodies means defining a plurality of parallel channels along which eggs are movable, means for moving eggs along said channels, and egg orienting means including discs associated with each channel and presenting substantially smooth egg engaging surfaces, the improvement which consists in forming and mounting pairs of said discs so that at least the peripheral portions of the discs are located at opposite sides of each channel and are yieldably movable toward and away from each other so as to lightly engage the eggs moving through the channels at opposite sides of the eggs and at points thereon where the eggs are of greatest diameter whereby eggs of various sizes, while engaged by the discs, are movable relative to the discs into position wherein the larger ends of the eggs face in the same direction.

9. Equipment as defined in claim 8 wherein the peripheral portions of the discs which engage the eggs are moved in the same direction as the eggs are moved through said channels and serve to engage and raise the larger ends of the eggs to orient the same.

10. Egg packing equipment including means for arranging eggs with the larger ends thereof facing in the same direction as defined in claim 8, together with conveyor means positioned to receive oriented eggs from said discs and having means thereon for holding the oriented eggs in a predetermined arrangement on said conveyor means.

References Cited

UNITED STATES PATENTS

| 2,710,089 | 6/1955 | Kerr | 198—30 |
| 2,939,572 | 6/1960 | Wurgaft | 198—210 |
| 3,124,231 | 3/1964 | Ott | 198—103 X |
| 3,260,348 | 7/1966 | Niederer | 198—33 |

EDWARD A. SROKA, *Primary Examiner.*